United States Patent
Dekker et al.

(10) Patent No.: US 6,350,299 B1
(45) Date of Patent: Feb. 26, 2002

(54) MULTI-CHAMBERED AIR/OIL SEPARATOR

(75) Inventors: Jan D. Dekker, LaPorte; Rick-Jan Dekker, Michigan City, both of IN (US); Gerald G. Geenen, Glenwood, IL (US)

(73) Assignee: Dekker Vacuun Technologies, Inc., Michigan City, IN (US)

( * ) Notice: Subject to any disclaimer, the term of this patent is extended or adjusted under 35 U.S.C. 154(b) by 0 days.

(21) Appl. No.: 09/513,897

(22) Filed: Feb. 28, 2000

(51) Int. Cl.⁷ .............................................. B01D 50/00
(52) U.S. Cl. .............................. 95/268; 55/320; 55/325; 55/330
(58) Field of Search .......................... 96/189, 190, 204, 96/206, 215, 219, 220; 55/320, 322, 325, 330; 95/243, 258, 268

(56) References Cited

U.S. PATENT DOCUMENTS

| | | | |
|---|---|---|---|
| 3,339,350 A | * 9/1967 | Sims | |
| 3,654,748 A | * 4/1972 | Bloom | |
| 3,721,069 A | * 3/1973 | Walker | |
| 4,359,329 A | * 11/1982 | Willeitner | |
| 4,539,023 A | * 9/1985 | Boley | 96/190 |
| 4,668,252 A | * 5/1987 | Gerdau | 96/189 |
| 5,494,501 A | * 2/1996 | Anspach et al. | 96/208 |
| 5,718,744 A | * 2/1998 | Ehlert | 96/189 |
| 5,730,786 A | * 3/1998 | Taub | 96/189 |
| 6,033,462 A | * 3/2000 | Dekker et al. | 95/248 |
| 6,048,376 A | * 4/2000 | Miller | 96/190 |
| 6,206,953 B1 | * 3/2001 | Bangs | 95/268 |

* cited by examiner

Primary Examiner—David A. Simmons
Assistant Examiner—Frank M. Lawrence
(74) Attorney, Agent, or Firm—R. Tracy Crump (57) ABSTRACT

An air/oil separator used with a closed loop oil seal system for a liquid ring vacuum pump, which incorporates a multi-chambered design for facilitating multiple stages of oil particulate separation is disclosed. The separator includes a rectangular reservoir tank and a tubular internal filter housing, which supports a filter element inside the reservoir tank. The filter housing extends horizontally inside the reservoir tank with an open distal end disposed within the reservoir tank and a closed proximal end protrudes from the proximal end wall of the reservoir tank. Extending horizontal across substantially the length of the reservoir tank, the filter housing and two internal baffle plates divide the reservoir tank into an upper inlet chamber and two collection chambers.

9 Claims, 5 Drawing Sheets

MULTI-CHAMBERED AIR/OIL SEPARATOR

This invention relates to air/oil separators used in closed loop oil seal systems for liquid ring vacuum pumps, and specifically an air/oil separator which incorporates a compact multi-chambered design for facilitating multiple stages of oil particulate separation.

BACKGROUND OF THE INVENTION

The breadth of applications for liquid ring vacuum pumps has rapidly increased with the development of the multiple stage air/oil separators by Dekker Vacuum Technologies, Inc. of Michigan City Ind. The Dekker air/oil separator, which is the subject of U.S. Pat. No. 6,033,462 and is incorporated herein by reference, uses a multi-chamber, multi-stage design in addition to a conventional filter element, which creates multiple stages of oil particulate separation. In addition to using gravitational force and the coalescing of oil particulate within the filter element, the separator of this invention improves oil condensation within the accumulator using the aerodynamic or thermodynamic conditions created by the multi-chambered design of the accumulator. The multi-chambered design of the accumulator enables a greater portion of the oil particulate to be condensed from the oil mist before passing through the filter element. The multi-chambered design restricts and slows the flow of oil mist through the inner and outer reservoir chambers, creates a difference in ambient temperatures between the inner and outer reservoir chambers and alters the direction of flow of the oil mist through the separator.

The application of liquid ring vacuum pumps is still limited by the physical size and space requirement of a closed loop oil recirculation system. In order for liquid ring vacuum pump systems to be used in a wider range of application, particularly low pressure or low horsepower applications, the air/oil separators needed for the oil recirculation systems must be more compact and efficient. Small compact conventional air/oil separators are commercially available, but rely heavily on filter elements to separate the oil particulate from the oil smoke. Although multi-chamber, multi-stage air/oil separators have increased the functionality of closed loop liquid ring vacuum pumps, the physical size of the multi-chambered reservoir tanks or accumulators have limited their application to large industrial vacuum pump applications. Consequently, a compact multi-chamber, multi-stage separator design, which can be incorporated into a variety of applications where physical space is limited is desirable.

SUMMARY OF THE INVENTION

The air/oil separator of this invention has a compact multi-chambered design that allows the separator and vacuum pump to be used in applications where physical space is limited. The separator includes a rectangular reservoir tank and a tubular internal filter housing, which supports a filter element inside the reservoir tank. The filter housing extends horizontally inside the reservoir tank with an open distal end disposed within the reservoir tank and a closed proximal end protrudes from the proximal end wall of the reservoir tank. Extending horizontally across substantially the length of the reservoir tank, the filter housing and two internal baffle plates divide the reservoir tank into an upper inlet chamber and two collection chambers. An upper inlet chamber is defined by the upper surface of the filter housing and a middle baffle plate. The middle baffle plate extends vertically downward from the top wall of the reservoir tank below the bottom surface of the filter housing. The end baffle plate extends vertically upward from the bottom of the reservoir tank, and divides the collection chambers into primary and secondary collection chambers at the proximal and distal ends of the reservoir tank respectively. The outer diameter of the filter housing is less than the internal width of the reservoir tank. Consequently, a narrow passage is created between the tubular body of the filter housing and the side walls of the reservoir tank. This narrow passage allows the oil discharge to flow from the inlet chamber into the primary collection chamber and allows oil smoke to vent from the primary to the secondary collection chamber. The lower portions of the end baffle plate and the splash plate are perforated to allow liquid oil to flow along the bottom of the reservoir tank between the primary and secondary collection chambers.

Oil discharge from the vacuum pump is deposited into the inlet chamber through an inlet port in the upper wall of the reservoir tank. The oil discharge flows through the narrow passages between the end wall of the reservoir tank and filter housing into the primary collection chamber. Oil discharge flowing around the filter housing and running down the side walls of the reservoir tank falls onto a splash plate before settling at the bottom of the reservoir tank. The liquid oil collected in the bottom of the reservoir tank is used to resupply the vacuum pump and is drawn out through an outlet port. Oil smoke flows from the primary collection chamber over the end baffle plate into the second collection chamber by the continuous flow of oil discharge into the separator and the vacuum draw from the exhaust port in the filter housing. Oil smoke is vented from the primary collection chamber into the secondary collection chamber back through the narrow passage created by the filter housing only between the middle and end baffle plates. Once vented into the second collection chamber, the oil smoke flows through the filter element, which removes any remaining oil particulate.

The introduction of the filter housing within the reservoir directly below the inlet port provides several functional advantages. Using an internal filter housing allows a physically more compact separator design, but also provides efficient gains. The internal filter housing is used to divide the reservoir tank into multiple chambers and to restrict the flow of oil discharge and oil smoke within the reservoir tank. The position of the filter housing and splash guard prevents the flow of oil from falling directly into a pool of liquid oil collected at the bottom of the reservoir. The splash of oil into the oil pool is another source of oil smoke. The position of the filter housing and splash guard reduce oil splash by reducing the distance that oil falls as well as slowing and deflecting the flow of oil discharge into the reservoir. The position of the filter housing inside the reservoir tank also provides a thermodynamic advantage. The surface of the filter housing is cooled by the operation of the air flowing through the filter element. Consequently, the heated oil discharge from the vacuum pump is deposited on a surface of the filter housing, where it is cooled to a lower ambient temperature by the operation of the filter element. The cool curved surface of the filter housing immediately promotes the condensation of the oil discharge.

Accordingly, an advantage of this invention is that the air/oil separator uses a compact multi-chamber, multi-stage design, which facilitates efficient oil separation and collection inside a small physical package.

Another advantage of this invention is that the separator includes a rectangular reservoir tank and a tubular internal filter housing, which supports a filter element inside the reservoir tank to reduce the physical size of the separator.

Another advantage of this invention is that the introduction of the internal filter housing within the reservoir tank improves oil particulate separation.

Another advantage of this invention is that the internal filter housing is used to divide the reservoir tank into multiple chambers and to restrict the flow of oil discharge and oil smoke within the reservoir tank.

Another advantage of this invention is that the separator uses the internal filter housing and splash guards to reduce oil splash within the reservoir tank, which decreases oil smoke.

Another advantage of this invention is that operation of the filter element inside the internal filter housing cools the surface of the filter housing, which promotes condensation of the oil particulate.

Other advantages will become apparent upon a reading of the following description.

BRIEF DESCRIPTION OF THE DRAWINGS

A preferred embodiment of the invention has been depicted for illustrative purposes only wherein.

DESCRIPTION OF THE PREFERRED EMBODIMENT

The preferred embodiment herein described is not intended to be exhaustive or to limit the invention to the precise form disclosed. It is chosen and described to best explain the invention so that others skilled in the art might utilize its teachings.

Figure 1:
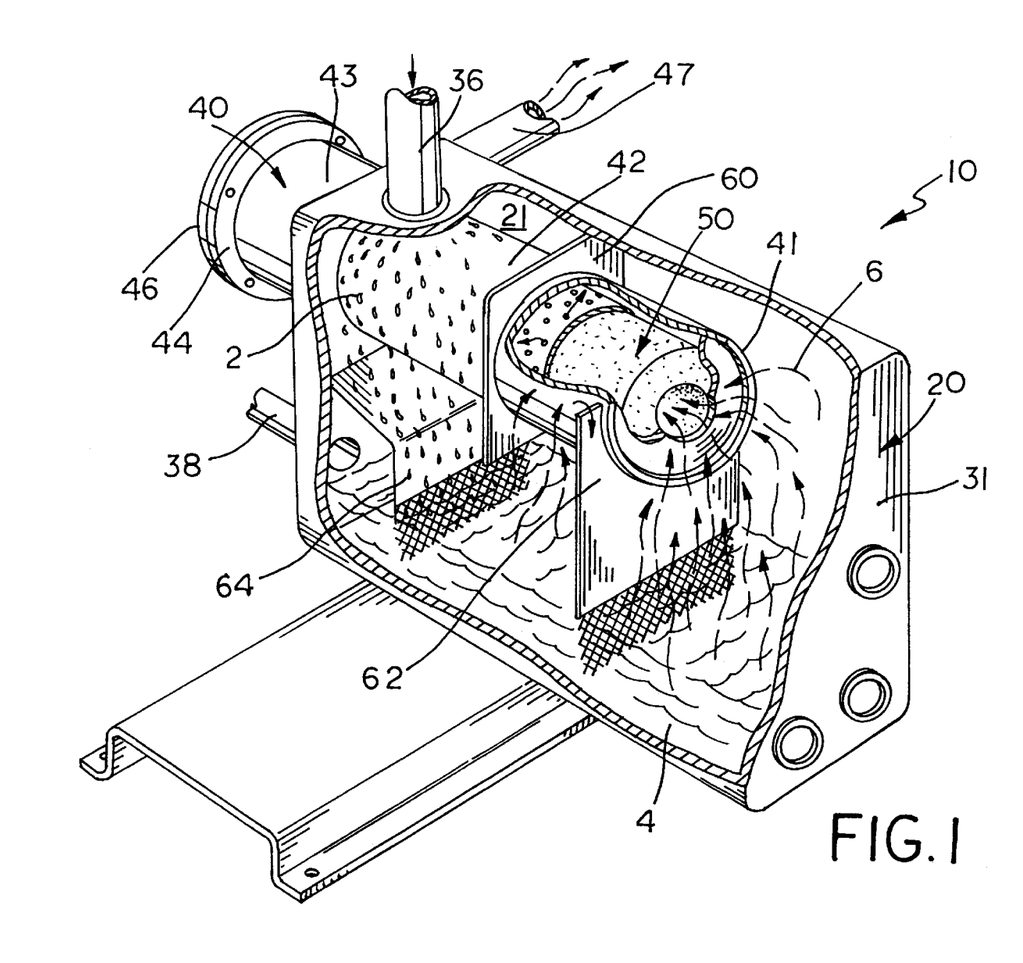
FIG. 1 is a perspective view of the separator of this invention having portions cut away to show the internal components.

FIG. 1 shows the air/oil separator 10 of this invention. Separator 10 is used as part of a closed loop oil recirculation system for a waterless liquid ring vacuum pump, such as the type manufactured and distributed by Dekker Vacuum Technologies, Inc. of Michigan City, Ind. The closed loop oil recirculation system may include various apparatus, which are used to circulate oil a top the liquid ring vacuum pump (not shown), such as piping, valves, oil reservoirs, heat exchangers, and filters (also not shown). Separator 10 is used to separate the liquid and gaseous oil particulate from the oil discharge deposited into the separator from the liquid ring vacuum pump. Generally, the oil discharge 2 deposited into separator 10 from a liquid vacuum ring pump is heated (an approximate range between 100° F. and 200° F.) and includes both liquid oil particles 4 and oil smoke 6, which is a gaseous mixture of air and oil particulate.

As shown, separator 10 includes a rectangular reservoir tank or accumulator 20 and a cylindrical internal filter housing 40, which supports a filter element 50 inside the reservoir tank. Reservoir tank 20 has proximal and distal end walls 30 and 31, two side walls 32, and top and bottom walls 33 and 34, which define an interior oil reservoir. Reservoir tank 40 is divided into multiple chambers by the location of filter housing 40 and two internal baffle plates 60 and 62. An L-shaped splash plate 64 is mounted within reservoir tank 20 beneath filter housing 40. Reservoir tank 20 includes an inlet port 36 and outlet ports 38, which are connected to the discharge and return lines of the vacuum pump. Inlet port 36 is located in top tank wall 33 at the proximal end of the reservoir tank. Outlet ports 38 are mounted at the bottom of proximal tank end wall 30. Reservoir tank 20 also includes an oil fill port 37. Oil fill port 37 allows the sealant oil to be manually poured into reservoir tank 20 for use in the operation of the pump. Reserve tank 20 also includes various other ports, which are to be connected to other apparatus in the recirculation systems or used for oil level gauges.

Filter housing 40 is an elongated tubular body 42, which supports the cylindrical filter element 50. Filter housing 40 has an open distal end 41 extending horizontally into reservoir tank 20 and the closed proximal end 43 protrudes from proximal tank end wall 30. Filter housing 40 is supported within the reservoir tank 20 by baffle plates 60 and 62. The protruding end 43 of filter housing 40 includes side exhaust port 47, which is connected to an air recirculation or venting system. Protruding filter housing end 43 also includes an annular end flange 44 and is enclosed by an end cap 46, which is secured to the flange by fasteners to hermetically seal the filter housing. Filter housing 40 also includes an oil outlet port 48. Outlet port 48 is connected to a return line 49, which allows oil collected in the bottom of the filter housing by the filter to be returned to reservoir tank 20.

Filter element 50 has a cylindrical body composed of or containing lipophic material. Filter element 50 is configured and dimensioned to fit inside the tubular filter housing body 42 with space 52 between the outer surface of filter element 50 and the inner surface of filter housing body 42. Preferably, filter element 50 uses a filtering flow design, whereby the oil mist is drawn axially into the filter's hollow center 51 and expelled radially outward through the coalesce filter material. Although this type of filtering mechanism is preferred, any conventional design and filtering mechanism commercially available to absorb and filter oil particulate may be employed without deviating from the teachings of this invention.

As shown, filter housing 40 and two internal baffle plates 60 and 62 divide the reservoir tank 20 into an upper inlet chamber 21 and two collection chambers 23 and 25. Upper inlet chamber 21 is defined by the upper surface of the filter housing 40 and middle baffle plate 60. Middle baffle plate 60 extends vertical downward from top tank wall 33 below the bottom surface of the filter housing. End baffle plate 62 extends vertically upward from bottom tank wall 34, and divides the collection chambers into primary and secondary collection chambers 23 and 25 at the proximal and distal ends of the reservoir tank respectively. The outer diameter of filter housing 40 is less than the internal width of reservoir tank 20 (between tank side walls 32). Consequently, two pairs of narrow passages are created between the tubular body of filter housing 40 and reservoir tank side walls 32: passages 22 between proximal tank end wall 30 and middle baffle plate 60 and passages 24 between middle baffle plate 60 and end baffle plate 62. Passage 22 allows the oil discharge to flow from inlet chamber 21 into the primary collection chamber 23. Passage 24 allows gaseous oil discharge to vent from the primary to the secondary collection chamber. The lower portions of the end baffle plate 62 and splash plate 64 are perforated to allow liquid oil to flow along the bottom of the reservoir tank between the primary and secondary collection chambers. The open end 41 of filter housing 40 opens into secondary collection chamber 25 to allow air flow into filter element 50, which removes any remaining oil particulate from the gaseous oil discharge before being exhausted from the separator.

The figures illustrate the operation of separator 10 and various stages of oil particulate separation. Although not shown, separator 10 is designed for and intended for use with a closed loop oil recirculation system for a liquid ring vacuum pump system. In a closed loop system at the start of operation, the separator contains an initial volume of oil that the liquid ring vacuum pump will draw before discharging it back into the separator. This initial volume of oil is added to separator 10 through oil fill port 37.

Figure 2:
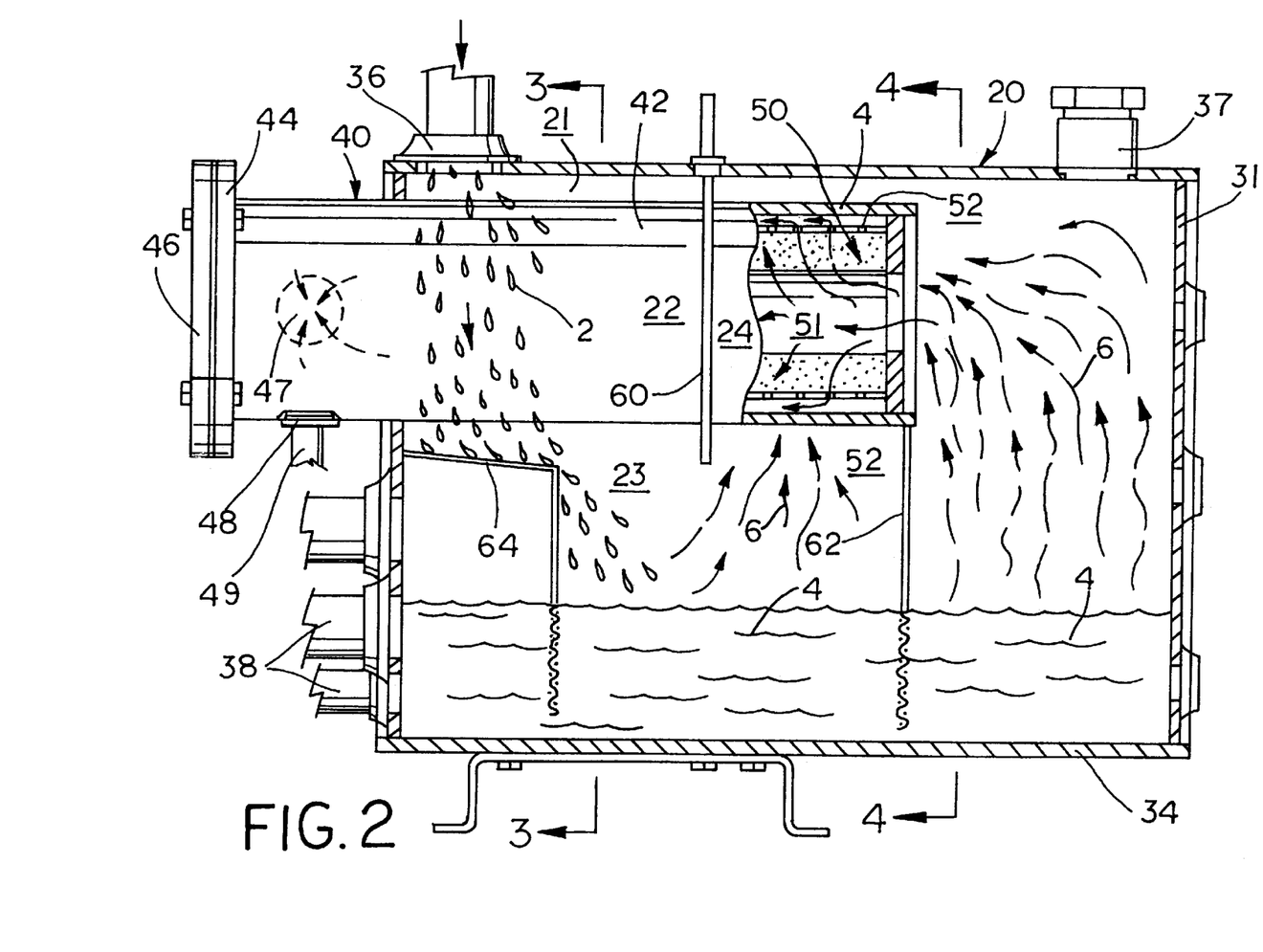
FIG. 2 is a side sectional view of the separator showing the flow of the oil and oil smoke through the separator.
Figure 3:
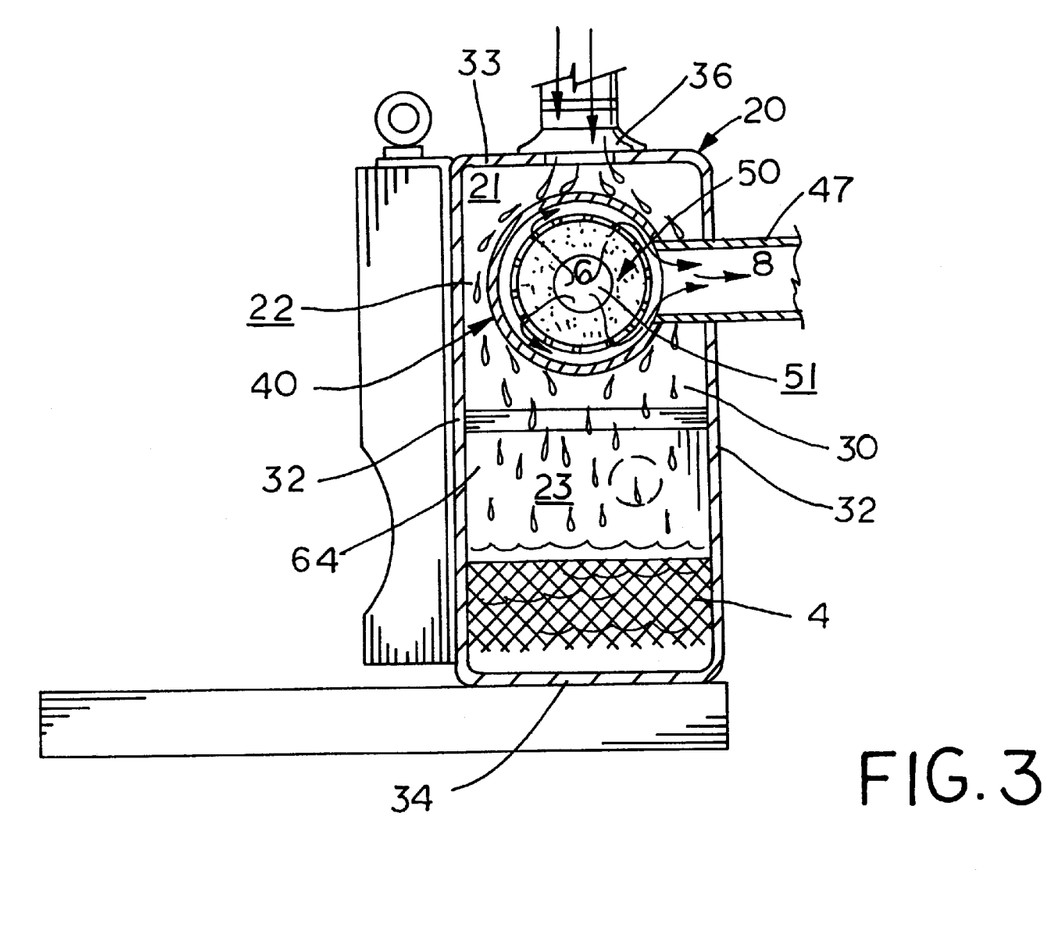
FIG. 3 is an end sectional view of the separator taken along line 3—3 of FIG. 2.
Figure 4:
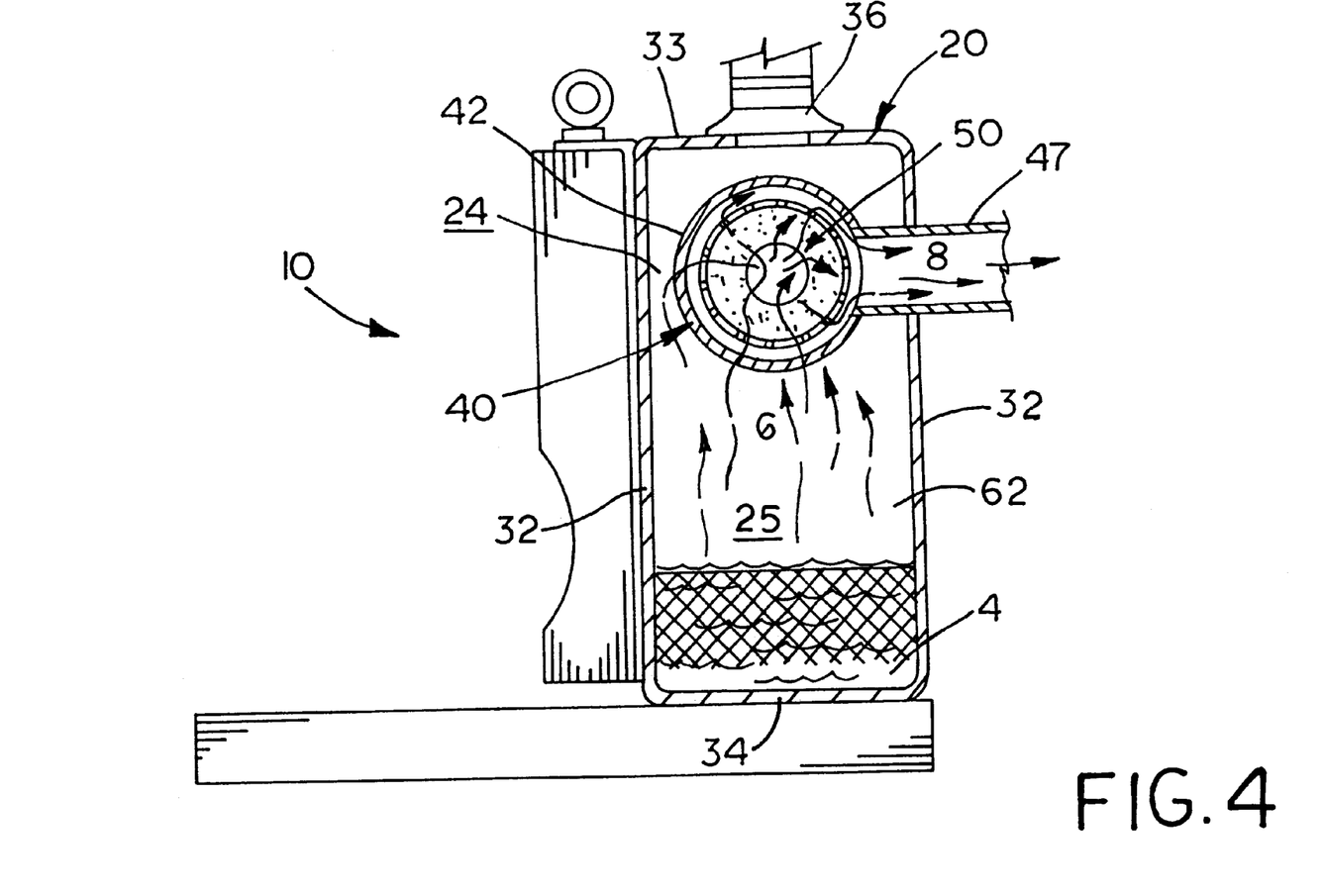
FIG. 4 is an end sectional view of the separator taken along line 4—4 of FIG. 2.
Figure 5:
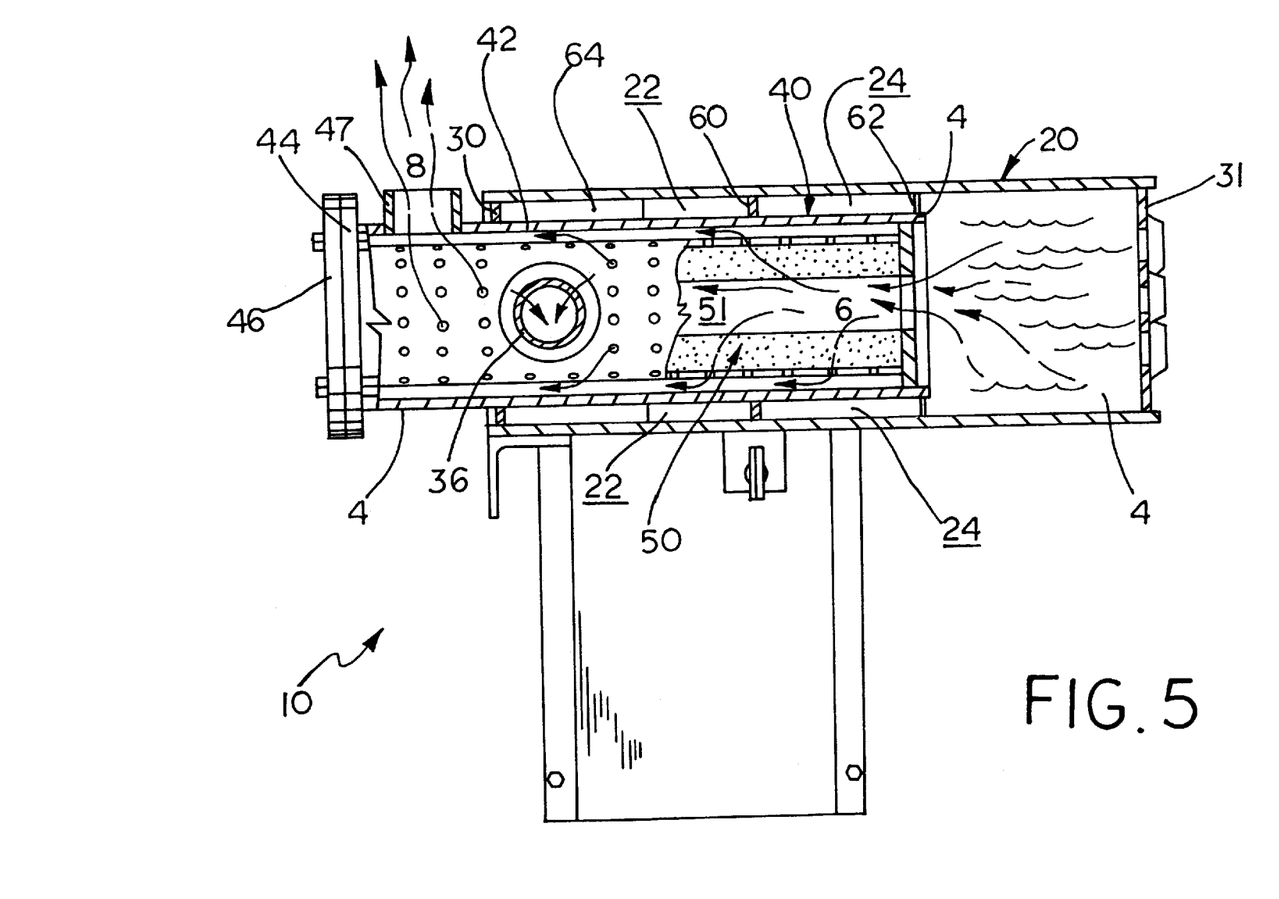
FIG. 5 is a top sectional view of the separator showing the flow of oil smoke through the outer chamber.

Oil discharge 2 from the pump is introduced into the inlet chamber 21 of reservoir tank 20 through inlet port 36. Inside the inlet chamber 21, oil discharge 2 falls a short distance directly onto arcuate surface of filter housing 40. Gravity separates the denser liquid oil 4 from the gaseous oil smoke 6. The heavy gaseous oil particles combine and condense separating out from the oil mist. Oil discharge 2 flows around filter housing 40 and passes through passages 22 into primary collection chamber 23. The liquid oil discharge 4 flowing around filter housing 40 and running down tank side walls 32 falls onto splash plate 64. The liquid oil 4 settles across the bottom of reservoir tank 20, while oil smoke 6 expands across the top of the primary collection chamber 23. As shown in FIGS. 1, 2 and 4, the perforate lower portions of end baffle plate 62 and splash plate 64 allow liquid oil 4 to move across the bottom of reservoir tank 20 between primary and secondary collection chambers 23 and 25. Generally, the oil level at the bottom of reservoir tank 20 extends above the perforated bottom portions of end baffle plate 62 and splash plate 64. Liquid oil 4 collected in the bottom of reservoir tank 20 is used to resupply the vacuum pump and is drawn out through outlet port 38. Oil smoke 6 passes from the first collection chamber 23 over end baffle plate 62 into the second collection chamber 25. End baffle plate 62 provides a structural mechanism, which restricts and slows the flow of oil mist between the primary and secondary collection chambers, and which serves as a structure upon which oil particulate may condense and collect. Oil smoke 6 is drawn from primary collection chamber 23 into the secondary collection chamber 25 by the continuous flow of oil discharge 2 into separator 10 and the vacuum draw from exhaust port 47. Oil smoke 6 is vented from primary collection chamber 23 into the secondary collection chamber 25 through passage 24. Once vented into secondary collection chamber 25, the remaining oil particulate within oil smoke 6 is drawn into filter element 50. Filter element 50 removes any remaining gaseous oil particles contained in the oil smoke and passes clean air 8 into the upper space 51 between the filter element and the filter housing body before being vented through exhaust port 47. Any oil collected at the bottom of the filter housing due to the saturation of filter element 50 is drained through outlet port 48 and return line 49. Draining off this oil collected within the filter housing prevents the reintroduction of oil particulate back into the filtered air before venting through exhaust port 47.

One skilled in the art will recognize several advantages of the design and operation of separator 10 of this invention over conventional air/oil separators. The multi-chambered design of separator 10 creates multiple stages of oil separation within the separator. The oil separation occurring in each stage is facilitated by the aerodynamic or thermodynamic conditions created by the multi-chambers of reservoir tank 20 in addition to the normal oil separation created by gravitational forces within the reservoir tank and the coalescing of oil particles within filter element 50. As oil discharge 2 moves through separator 10, it loses thermal energy. Consequently, the ambient temperature inside each successive chamber of the reservoir tank is less than the preceding. Venting the hot oil smoke through passage 24 from first collection chamber 23 into the cooler second collection chamber 25 not only slows the flow of the oil smoke, but creates a cooling effect, which results in additional condensation to remove more gaseous oil particles from the oil smoke. Since the ambient temperature inside primary collection chamber 23 is more than the ambient temperature inside secondary collection chamber 25, venting oil smoke 6 into the secondary collection chamber cools the oil smoke lowering its saturation point and thereby inducing additional condensation.

The introduction of filter housing 40 within reservoir tank 20 directly below inlet port 36 provides several functional advantages. Using an internal filter housing inside the reservoir tank allows a physically more compact separator design, but also provides efficient gains. Filter housing 40 is positioned within reservoir tank 20 not only to conveniently divide the reservoir tank into multiple chambers, but to facilitate the separation of the oil particulate from the oil smoke in the discharge.

As shown, filter housing 40 is positioned directly below inlet port 36. In this position, the filter housing immediately impedes the flow of oil discharge 2 into the reservoir. The flow of oil discharge from the pump into the inlet chamber is very turbulent, and its introduction into the separator releases the majority of the oil smoke. Oil discharge 2 must pass through passages 22 between tank side walls 32 and the side of filter housing body 42, which slows and restricts the flow of the oil discharge into the primary collection chamber and isolates a large portion of the gaseous oil smoke within the inlet chamber. Slowing and restricting the flow of oil discharge allows more condensation to occur. The curved surface of filter housing body 42 deflects the flow of oil discharge 2 onto tank side walls 32. Tank side walls 32, which are cooled by conduction with the ambient atmosphere, provide a large surface area on which oil particulate can condense.

Oil particulate separation is also promoted by venting oil smoke 6 up through passage 24 between the primary and secondary collection chambers 23 and 25. Again, venting oil smoke through the narrow passage restricts and slows the flow of oil mist, which permits more oil particulate to condense before exiting primary collection chamber 23. Restricting the flow of mist creates turbulence that further enhances condensation of the oil particulate. The heavier liquid particulate must be carried with the oil smoke against gravity to pass over end baffle plate 62 into secondary collection chamber 25. Consequently, less oil particulate passes into the secondary collection chamber.

The internal filter housing also reduces the creation of oil smoke within separator 10. Oil smoke 6 can be created by the splash of oil into the oil pool inside the reservoir tank. Liquid oil 4 condenses and runs down tank side walls 32 or drips off of the bottom of filter housing body 42 onto splash guard 64. The positions of filter housing 40 and splash guard 64 prevent the flow of oil discharge from falling directly into a pool of liquid oil 4 collected at the bottom of the reservoir tank. The position of filter housing 40 and splash guard 64 reduce oil splash by deflecting the flow of oil and reducing the distance that oil falls, as well as, slowing and restricting the flow of oil discharge into reservoir tank 20.

The position of the internal filter housing 40 itself can also provide a thermodynamic advantage. The surface of filter housing body 42 is cooled by the operation of the filter element 50 drawing air through it. As show in the figures, the remaining oil smoke 6 is drawn axially into the center of the filter element 50 and expelled radially into the area between the filter element and the filter housing before exiting through exhaust port 47. Drawing oil smoke 6 through filter element 50 radially creates a cooling effect inside the filter element that is transferred by convection to filter housing body 42. Consequently, the heated oil discharge from pump is deposited on a surface of filter housing body 42, which cooled to a lower ambient temperature by the operation of the filter element. The cool curved surface of filter housing body 42 immediately promotes the condensation of oil particulate from oil discharge 2.

It should also be noted that the flow of oil smoke through separator 10 has multiple direction changes due to the multi-chamber design of reservoir tank 20. While liquid oil 4 collects across the bottom of reservoir tank 20, oil particulate in the oil smoke 6 first travels downward into reservoir tank 20 and between the inlet and primary collection chambers 21 and 23 at the proximal end of separator 10, then up and over end baffle plate 62 into secondary collection chamber 25 to the distal end of the separator, and finally back to the proximal end of the separator through filter element 50. These multiple direction changes slow the flow rate of the oil mist and create turbulence within the separator, which all contributes to improved oil separation.

It is understood that the above description does not limit the invention to the details given, but may be modified within the scope of the following claims.

We claim:

1. In an oil recirculation system for a vacuum pump, a method for separating oil particulate from oil discharge (2) created by the vacuum pump, where the oil discharge includes both liquid oil (4) and gaseous oil smoke (6), using an air/oil separator (10), which includes a reservoir tank defining an interior thereof for receiving the oil discharge from the pump and accumulating liquid oil separated from the oil discharge therein and having an inlet port for introducing the oil discharge into the interior and an outlet port for returning liquid oil collected within the tank interior to the oil circulation system, first and second baffle plates disposed vertically within the tank interior, an elongated tubular filter housing positioned beneath the inlet means having one end positioned horizontally within the tank interior and extending through the first and second baffle plates and the other end protruding from the tank, a filter element supported within the filter housing inside the tank interior, and a splash plate mounted within the tank interior directly beneath the filter housing, wherein the tank interior is divided by the filter housing, first baffle plate and second baffle plate into an inlet chamber, a first collection chamber and a second collection chamber, such that the inlet chamber is defined and separated from the first and second collection chambers by the upper surface of the filter housing and first baffle plate, and the first collection chamber is separated from the second collection chamber by the filter housing and the second baffle plate, the method comprising the following steps:
 a. depositing the oil discharge into the inlet chamber of the reservoir tank directly over the filter housing means.
 b. venting the oil discharge from the inlet chamber into the primary collection chamber over the filter housing to slow and restrict the flow of the oil discharge.
 c. separating liquid oil and the gaseous oil smoke from the oil discharge within the first collection chamber using gravitational force;
 d. separating a portion of the oil particulate from the oil smoke within the first collection chamber via condensation;
 e. venting the oil smoke from the first collection chamber into the second collection chamber around the filter housing over the second baffle plate.
 f. separating a portion of the oil particulate from the oil smoke within the second collection chamber by condensation;
 g. drawing the oil smoke from the second collection chamber through the filter element to coalesce the remaining portion of oil particulate contained in the oil smoke.

2. The method of claim 1 wherein step b includes venting the oil discharge over the filter housing and onto the splash plate to reduce oil splash.

3. An air/oil separator (10) used as part of a closed loop oil circulation system for a vacuum pump, which separates and collects oil particulate from oil discharge, generated by the operation of the vacuum pump, where the oil discharge (2) includes liquid oil (4) and gaseous oil smoke (6), the separator comprising:

a reservoir tank (20) including a top wall, a bottom wall, end walls, and side walls, which define an interior thereof for receiving the oil discharge from the pump and accumulating liquid oil separated from the oil discharge therein and having inlet port (36) for introducing the oil discharge into the interior and outlet port (38) for returning liquid oil collected within the tank interior to the oil circulation system, a first baffle plate (60) disposed vertically within the tank interior and extending downward from the top of the reservoir tank, a second baffle plate (62) disposed vertically within the tank interior and extending upward from the bottom of the reservoir tank, an elongated tubular filter housing (40) positioned beneath the inlet means (36) such that oil discharge deposited into the reservoir tank falls directly onto the filter housing, the filter housing having one end (41) positioned horizontally within the tank interior and extending through the first and second baffle plates and the other end (43) protruding from the tank, a filter element (50) supported within the filter housing inside the tank interior for removing the remaining portion of the oil particulate from the oil smoke passed through the reservoir tank, and a splash plate (64) mounted within the tank interior directly beneath the filter housing, the filter housing, first baffle plate and second baffle plate divide the tank interior into an inlet chamber (21), a first collection chamber (23) and a second collection chamber (25), wherein the inlet chamber (21) is defined and separated from the first and second collection chambers by the upper surface of the filter housing (40) and first baffle plate (60), and the first collection chamber (23) is separated from the second collection chamber (25) by the filter housing and the second baffle plate (62), the filter housing (40) is spaced laterally from the tank side wall to create a first and second passage (22, 24) between the filter housing and tank side wall, whereby oil discharge may pass between the inlet chamber and the first collection chambers through the first passage and between the first collection chamber and second collection chamber through the second passage.

4. An air/oil separator (10) used as part of a closed loop oil circulation system for a vacuum pump, which separates and collects oil particulate from the oil discharge, generated by the operation of the vacuum pump, where the oil discharge (2) includes liquid oil (4) and gaseous oil smoke (6), the separator comprising:

- a reservoir tank (20) defining an interior thereof for receiving the oil discharge from the pump and accumulating liquid oil separated from the oil discharge therein and having inlet means (36) for introducing the oil discharge into the interior and outlet means (38) for returning liquid oil collected within the tank interior to the oil circulation system,
- a tubular filter housing (40) positioned horizontally across the tank interior beneath the inlet means and having one end (41) disposed within the tank interior and the other end (43) protruding from the tank,
- filter means (50) disposed within the filter housing for removing the remaining portion of the oil particulate from the oil smoke passed through the reservoir tank,
- a first baffle plate (60) disposed vertically within the tank interior and extending downward from the top of the reservoir tank, and
- a second baffle plate (62) disposed vertically within the tank interior and extending upward from the bottom of the reservoir tank,
- the filter housing, first baffle plate and second baffle plate constituting means for dividing the tank interior into an inlet chamber (21), a first collection chamber (23) and a second collection chamber (25).

5. The separator of claim 4 wherein the first collection chamber (23) is separated from the second collection chamber (25) by the filter housing and the second baffle plate (62).

6. The separator of claim 4 wherein the reservoir tank (20) includes a side wall (32), the filter housing (40) is spaced laterally from the tank side wall to create a first and second passage (22, 24) between the filter housing and tank side wall, whereby oil discharge may pass between the inlet chamber and the first collection chamber through the first passage and between the first collection chamber and second collection chamber through the second passage.

7. The separator of claim 6 wherein the lateral width of the tank interior (20) is greater than the lateral width of the filter housing (42), whereby the filter housing is spaced from the side wall of the reservoir tank.

8. The separator of claim 4 wherein the inlet chamber (21) is defined and separated from the first and second collection chambers by the upper surface of the filter housing (40) and first baffle plate (60).

9. The separator of claim 4 wherein the filter housing (40) is positioned beneath the inlet means (36) such that oil discharge deposited into the reservoir tank falls directly onto the filter housing.

* * * * *